Sept. 15, 1959          A. F. HUDSON          2,903,781
METAL CUTTING TOOL AND HOLDER
Filed July 14, 1955          2 Sheets-Sheet 1
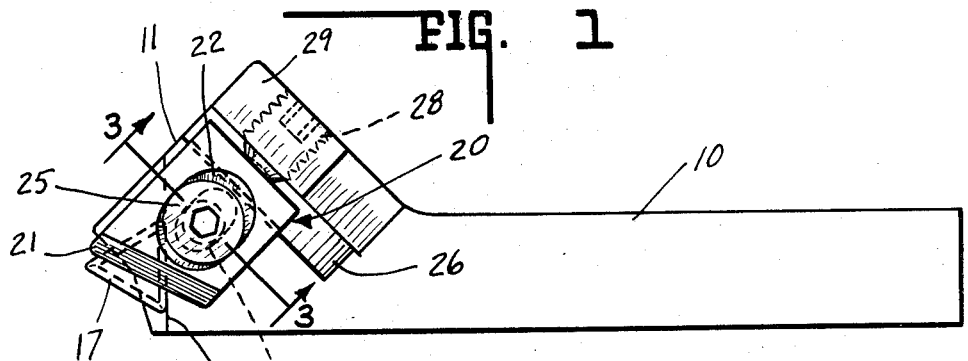
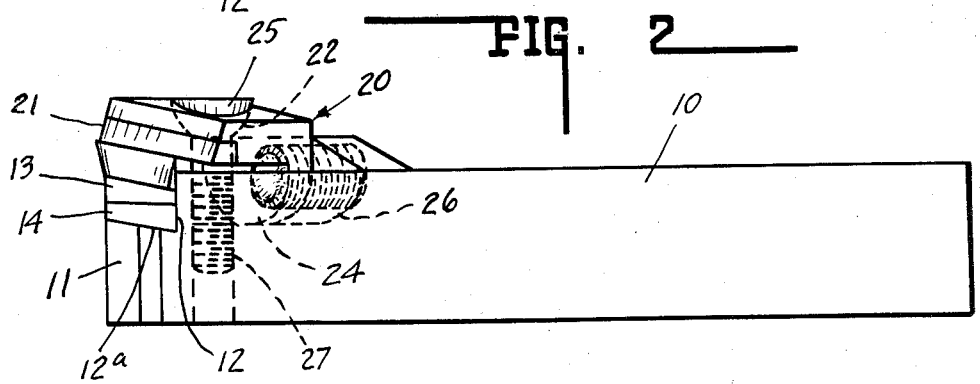
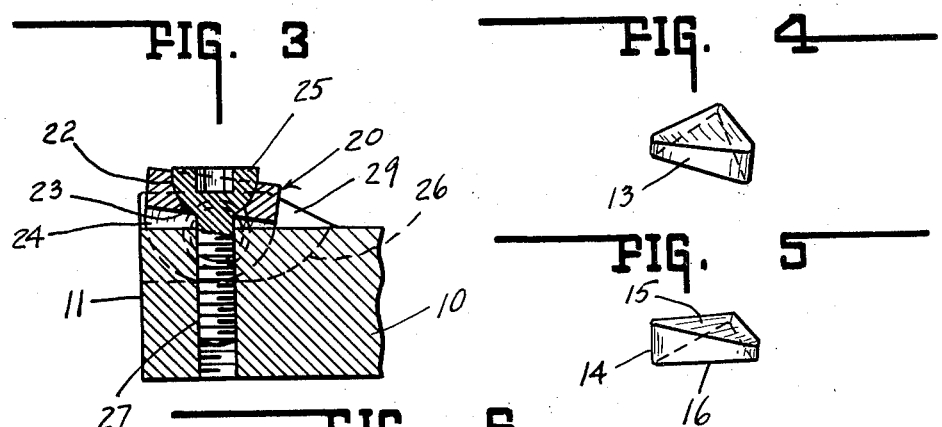
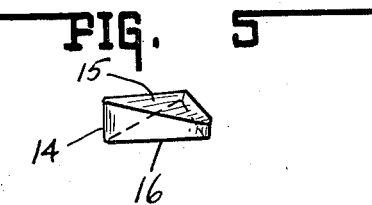
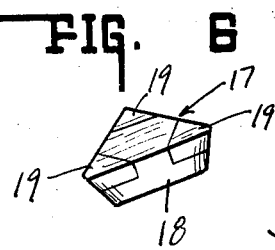
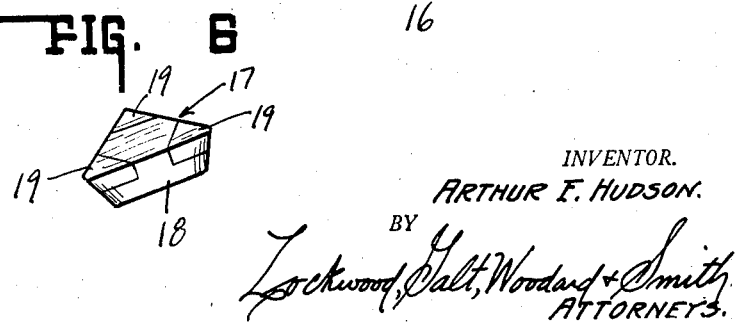
INVENTOR.
ARTHUR F. HUDSON.
BY Lockwood, Galt, Woodard & Smith
ATTORNEYS.

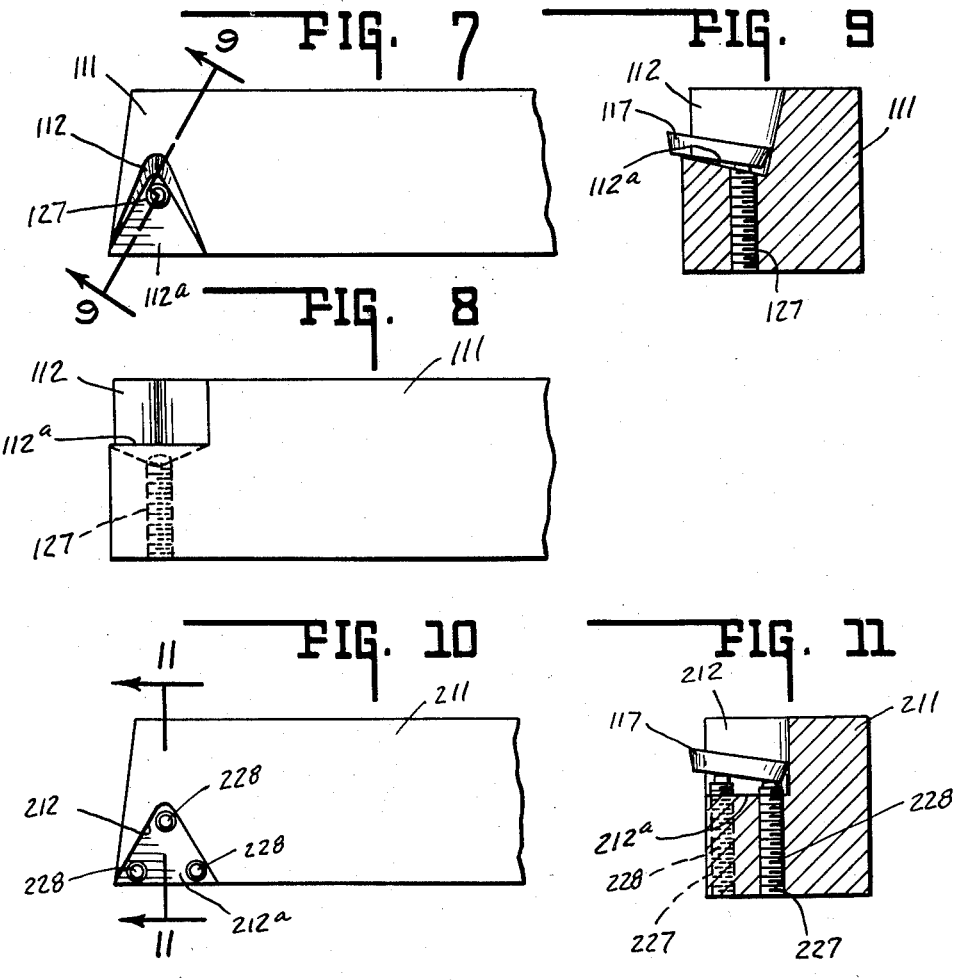

though the highly ductile materials such as some of the stainless steels, aluminum and titanium require even higher clearance angles.

2,903,781

METAL CUTTING TOOL AND HOLDER

Arthur F. Hudson, Huntington, Ind.

Application July 14, 1955, Serial No. 522,024

8 Claims. (Cl. 29—96)

This invention relates generally to metal cutting tools, and more particularly to a tool having means for multiple, selective variation of the top rake and radial side clearance of its cutting edge.

It is the primary object of this invention to provide means in the form of a cutting insert and a supporting plate or plates which make possible in an easy, facile and ready manner a presentation of the insert to the various types of metal with which the tool is used, at the desired clearance angle. Heretofore in conventional tools the angle of the insert cutting edge has been fixed.

In order to present such cutting edge to the work and prevent the portion immediately thereunder from rubbing because of lack of clearance under the cutting edge, it has been trade practice to tilt the top face of the tool forward thereby causing the top of the tool to have negative top rake. The disadvantage, however, of this improvisation lies in the fact that such negative top rake causes increased chip pressure which in turn causes more heat and reduces the tool life when machining steels and the like. With the present invention the desired negative top rake and radial side clearance may be obtained simply by rearranging the insert and its supporting plate or plates.

It is a further object of the present invention to provide a chip breaker or roller of such character and construction that it may be used effectively with the insert and its supporting plate or plates regardless of the angle to which the cutting edge of the insert is adjusted. Three different angles might be generally termed as the most common cutting angles. For example, a negative top rake of approximately minus 6° is desirable when the insert is used in machining materials such as cast iron, brittle brass, bronze and the like. A positive top rake of approximately plus 6° is desirable when the insert is used in cutting the more ductile machine steels, although the highly ductile materials such as some of the stainless steels, aluminum and titanium require even higher clearance angles.

On the other hand, a neutral top rake such as plus or minus zero is desirable when some grades of steel in the low ductile range are being cut. With the present invention these three most common cutting angles are readily achieved, as aforesaid, merely by changing the position within the cutting tool of the insert and its supporting plate or plates. Many more angles may be obtained by combining the entire range of the two tapered plates and/or machining the supporting surface of the tool on an angle. Thus a multiplicity of desirable cutting angles may readily be realized.

It is a still further object of the present invention to provide means for adjusting the depth of the chip breaker or roller. As is well known, it is desirable to vary the depth of a chip breaker or roller depending upon the type of material being machined and the depth of the cut. For example, aluminum would require a shorter distance between the chip breaker or roller face and the cutting edge of the insert than most analyses of steel because of the increased ductility of aluminum. Furthermore, the depth should be adjustable in relation to the rate of feed since a light finishing feed requires a much shorter depth than does a heavy stock removal feed.

It is a still further object of the present invention to provide a tool of such character and construction that the foregoing advantages and objectives may be realized by forming only a recess or re-entrant portion for the insert and its supporting plate or plates within the head of the tool, thereby reducing the expense inherent in the formation of a bore entirely through the head as has heretofore been conventional.

The full nature of the invention will be understood from the accompanying drawings and the following description and claims.

In the drawings—

Fig. 1 is a top plan view of the invention.

Fig. 2 is a side elevation view thereof.

Fig. 3 is a vertical section taken on lines 3—3 of Fig. 1 in the direction of the arrows, with parts of the tool holder broken away.

Fig. 4 is a perspective view of one of the supporting plates.

Fig. 5 is a perspective view of another supporting plate.

Fig. 6 is a perspective view of the cutting bit or insert.

Fig. 7 is a schematic top plan view of a modification of the invention with the hold-down construction and arrangement removed, the better to illustrate the modification.

Fig. 8 is a front elevation view thereof.

Fig. 9 is a vertical section view taken on lines 9—9 of Fig. 7 in the direction of the arrows.

Fig. 10 is a schematic top plan view of a further modification of the invention with the hold-down assembly removed.

Fig. 11 is a vertical section view taken on lines 11—11 of Fig. 10 in the direction of the arrows.

In the drawings there is shown a metal cutting tool assembly comprising the holder 10 which generally speaking is of conventional configuration and is of the type adapted to be mounted in the tool post of a metal cutting lathe. The holder includes a head portion 11 which has formed therein a recess or re-entrant portion 12 for receiving the plurality of tapered supporting plates 13 and 14. These plates are illustrated as being triangular in shape but obviously can be rectangular, square or polyhedral. As will be observed from Figs. 4 and 5, the opposite faces 15 and 16 of the supporting plate 14 are out of parallel as are those of plate 13. The bottom 12a of the recess may also be formed out of parallel with the bottom of the tool holder or to state it another way, may be formed at an angle other than a right angle relative to the axis of said recess.

The plates may be rearranged relative to each other in a plurality of ways, as is readily apparent, so as to present a multiplicity of different supporting planes for the tool bit shown generally at 17. The bit includes a steel base portion 18 and carbide inserts 19. Its opposite faces are parallel as shown but it has a preformed cutting or radial clearance. This last mentioned characteristic makes possible a use of the bit on only one side and precludes a use by turning the bit over as may be done with conventional bits. However, there is a multiple choice of clear angles on this one side, both top rake and side clearance, which is not possible in conventional bits having their sides at right angles to their tops. Thus with the present invention a bit with a preformed radial clearance of 18° will permit 9° side clearance while leaving 9° top clearance.

A chip breaker or roller is shown generally at 20, it comprising the carbide tip 21, and having an elliptical recess 22 formed therein including a curved bottom that terminates in a frusto-conical clearance opening 23. The breaker also includes the semi-circular, depending bearing portion 24.

A cap screw 25 is seated within the elliptical recess and extends into the threaded bore 27 formed in the tool head. The depending bearing portion 24 is seatable in a complementary groove 26 formed in the tool head rearwardly of bore 27. As is apparent particularly in Fig. 1, the width of the bearing is less than the width of the groove. In order to retain the chip breaker in the desired position relative to the cutting edge of the bit a set screw 28 or the like is threaded through the rear wall 29 of the head into engagement with the bearing. Thus the depth of the chip breaker may be controlled by simple adjustment of the set screw.

Furthermore, by reason of the arrangement and construction of the breaker set forth above, it is possible for it to be rocked laterally of the head on its bearing portion within the groove. Thus as the top rake of the bit is varied, the angle of the carbide tip portion of the breaker may readily be varied so that it has a fine line bearing surface engaging the bit with high pressure per unit rate to prevent accumulation of chips therebeneath. As is also apparent, the breaker may be shifted longitudinally to vary its depth. As previously stated it is desirable to vary the depth of a chip breaker depending upon the type of material being machined and the depth of the cut. These adjustments may be made in a ready, easy and facile manner.

In operation the supporting plates for the bit may be so arranged as to support the bit with the desired top rake and radial side clearance. A multiplicity of variations are selectively possible because of the fact that the opposite faces of the supporting plates are out of parallel, and because of the further fact that the base of the plate recess may be formed out of parallel with the bottom of the tool. Next the hold-down member or chip breaker is adjusted until it is located in the desired position relative to the bit, and then the set screw turned until it abuts the rear face of the bearing. The tool is now ready for use.

Modifications of the invention are illustrated in Figs. 7–11 inclusive. As is readily apparent, different means from the aforementioned supporting plates are utilized to vary, selectively, the clearance angle of the cutting edge of the tool bit 117.

In Fig. 7 the head portion 111 (shown schematically) has a recess or re-entrant portion 112, the bottom 112a of which is downwardly and inwardly inclined from a side of said head. The bottom is thus out of parallel with the top and bottom surfaces of the head. The walls defining the recess inwardly converge relative to the top surface of said head and conform generally to the taper of the tool bit as shown.

Formed through the head and opening into the recess adjacent its innermost apex is the threaded bore 127. Any suitable screw may be threaded into this bore. When it is desired to vary the angularity of the cutting edge of the bit it is necessary only to turn the screw and elevate the adjacent portion of the bit. This will result in the bit being rocked about the fulcrum which comprises that base of the triangular recess that is opposite the bore opening. The cutting edge of the bit will thus be varied as desired. While the chip breaker or roller 20 has not been illustrated in Figs. 7–11 it is to be understood, of course, that such or other suitable hold-down means will be used.

A still further modification of the invention is shown in Figs. 10 and 11 wherein the recess 212 is shown to have a bottom 212a that is not inclined but instead is flat, i.e. in a plane parallel to the top and bottom surfaces of the tool.

In order to secure the desired clearance angle in this modification, a plurality of vertically adjustable means are employed. To this end three bores 227 are provided each being adjacent an apex of the triangularly shaped recess, as shown in Fig. 10. Into these bores are threaded the screws 228 which are, of course, the aforementioned vertically adjustable means. It is to be understood that the chip breaker or roller will also be used in association with this modification.

While the invention has been illustrated and described in detail in the drawings and foregoing description, the same is to be considered as illustrative and not restrictive in character, it being understood that only the preferred embodiments have been shown and described and that all changes and other modifications that come within the spirit of the invention and the scope of the claims are also desired to be protected.

The invention claimed is:

1. A metal cutting tool assembly comprising a tool bit, a tool holder for said bit comprising a head having a recess formed therein, the bottom of said recess being formed out of parallel with the bottom of said head, a pair of bit supporting plates within said recess, each of said plates having its opposite faces out of parallel, and a hold-down member clamped to said tool holder and engaging said bit.

2. A metal cutting tool assembly comprising a tool bit having a plurality of cutting edges of equal length, a tool holder for said bit comprising a head having a bit receiving recess formed therein, the bottom of said recess being formed out of parallel with the bottom of said head, a pair of bit supporting plates within said recess, each of said plates having its opposite faces out of parallel, and a hold-down member clamped to said tool holder and engaging said bit.

3. A metal cutting tool assembly comprising a tool bit having a plurality of cutting edges of equal length, the sides of said bit being inwardly tapered to provide a preformed cutting clearance, a tool holder for said bit comprising a head having a bit receiving recess formed therein, a pair of bit supporting plates within said recess, each of said plates having its opposite faces out of parallel, and a hold-down member clamped to said tool holder and engaging said bit.

4. A metal cutting tool assembly comprising a tool bit having a plurality of cutting edges of equal length, the sides of said tool bit being inwardly tapered to provide a pre-formed cutting clearance, a tool holder for said bit including a head having a bit receiving recess formed therein, the bottom of said recess being formed out of parallel with the bottom of said head, a pair of bit supporting plates within said recess, each of said plates having its opposite faces out of parallel, and a hold-down member clamped to said tool holder and engaging said bit.

5. A metal cutting tool assembly comprising a tool bit, a tool holder for said bit comprising a head having a bit receiving recess formed therein adjacent one end and a transversely curved groove formed therein adjacent its other end, a pair of bit supporting plates within said recess, each of said plates having its opposite faces out of parallel, and a hold-down member clamped to said tool holder and engaging said bit, said member comprising an end portion having surfaces for deflecting metal chips and a fine line bearing surface engaging said bit with high pressure per unit rate to prevent accumulation of chips beneath said hold-down member, and a second end portion seated in said groove, and means connecting said member and said head for rocking said member laterally relative to its longitudinal axis.

6. A metal cutting tool assembly comprising a tool bit having its upper and lower faces parallel, a tool holder for said bit comprising a head having a bit receiving recess formed therein adjacent one end and a transversely curved groove therein adjacent its other end, the bottom of said recess being formed out of parallel with the bottom of said head, a pair of bit supporting plates within said recess, each of said plates having its opposite faces out of parallel, and a hold-down member clamped to said tool holder and engaging said bit, said member comprising an end portion having surfaces for deflecting metal chips and a fine line bearing surface engaging said bit with high pressure per unit rate to prevent accumulation of chips beneath said hold-down member, and a second end portion seated in the said groove, and means connecting said member and said head for rocking said member laterally relative to its longitudinal axis.

7. A metal cutting tool assembly comprising a tool bit having its upper and lower faces parallel, said bit having a plurality of cutting edges of equal length, the sides of said bit being inwardly inclined to provide a preformed cutting clearance, a tool holder for said bit comprising a head having a bit receiving recess formed therein adjacent one end and a transversely curved grooved formed therein adjacent its other end, a pair of bit supporting plates within said recess, each of said plates having its opposite faces out of parallel, and a hold-down member clamped to said tool holder and engaging said bit, said member comprising an end portion having surfaces for deflecting metal chips and a fine line bearing surface engaging said bit with high pressure per unit rate to prevent accumulation of chips beneath said hold-down member, and a second end portion seated in said groove, and means connecting said member and said head for rocking said member laterally relative to its longitudinal axis.

8. A metal cutting tool assembly comprising a tool bit having its upper and lower faces parallel, said bit having a plurality of cutting edges of equal length, the sides of said bit being inwardly inclined to provide a preformed cutting clearance, a tool holder for said bit comprising a head having a bit receiving recess formed therein adjacent one end and a transversely curved groove formed therein adjacent its other end, the bottom of said recess being out of parallel with the bottom of said head, a pair of bit supporting plates within said recess, each of said plates having its opposite faces out of parallel, and a hold-down member clamped to said tool holder and engaging said bit, said member comprising an end portion having surfaces for deflecting metal chips and a fine line bearing surface engaging said bit with high pressure per unit rate to prevent accumulation of chips beneath said hold-down member, and a second end portion seated in said groove, and means connecting said member and said head for rocking said member laterally relative to its longitudinal axis.

References Cited in the file of this patent

UNITED STATES PATENTS

| | | |
|---|---|---|
| 2,675,604 | Plummer | Apr. 20, 1954 |
| 2,706,327 | Bodin | Apr. 10, 1955 |

FOREIGN PATENTS

| | | |
|---|---|---|
| 275,215 | Great Britain | Jan. 19, 1928 |
| 1,041,370 | France | May 27, 1953 |
| 1,084,955 | France | Jan. 26, 1955 |